Dec. 14, 1937.  H. P. KUEHNI  2,102,421
CATHODE RAY OSCILLOGRAPH
Filed July 12, 1934

Inventor:
Hans P. Kuehni,
by Harry E. Dunham
His Attorney.

Patented Dec. 14, 1937

2,102,421

UNITED STATES PATENT OFFICE 2,102,421

CATHODE RAY OSCILLOGRAPH

Hans P. Kuehni, Schenectady, N. Y., assignor to General Electric Company, a corporation of New York Application July 12, 1934, Serial No. 734,784

3 Claims. (Cl. 250—27.5)

My invention relates to cathode ray oscillographs and the like and its object is to provide a simple means for adjusting the position of the cathode ray beam of such apparatus without, however, interfering with its deflection in response to the phenomenon under investigation.

In a cathode ray oscillograph, a cathode ray or beam is thrown upon a tracing surface, which may be an observing screen or photosensitive film, and is deflected thereon by deflecting means such as for example voltages impressed upon deflecting plates which cause the ray to bend or deflect in response to the voltage variations. In this way, curves are obtained which are representative of some phenomenon to which the deflecting voltages are responsive. Ordinarily, with no deflecting voltage impressed upon the deflecting plates, the beam or ray strikes the tracing surface at its center, thus establishing a permanent zero position of the ray on such surface. Oftentimes, it is desirable to start the tracing movement of the beam at some point other than the center of the surface in order to more fully utilize the tracing space available and it is the object of my invention to provide simple means whereby the initial or zero position of the beam may be adjusted in any desired direction and at any desired distance from the center of the surface without interfering with the subsequent measurement deflections of such beam.

In carrying my invention into effect, I employ a magnetic field which is adjustable in its direction and strength for deflecting the cathode ray as desired before it strikes the tracing surface. This deflection of the ray is in addition to any deflection of the ray produced by the usual deflecting means and without interference therewith.

Figure 3:
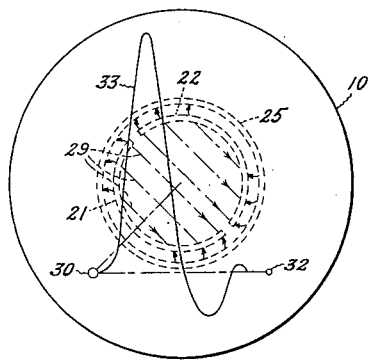
Figure 4:
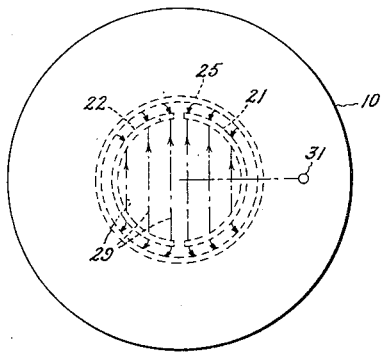

The features of my invention which are believed to be novel and patentable will be pointed out in the claims appended hereto. For a better understanding of my invention reference is made in the following description to the accompanying drawing in which Fig. 1 illustrates the application of my invention to an ordinary cathode ray oscillograph tube; and Figs. 2, 3, and 4 illustrate the nature of the magnetic field as adjusted for different results.

Figure 1:
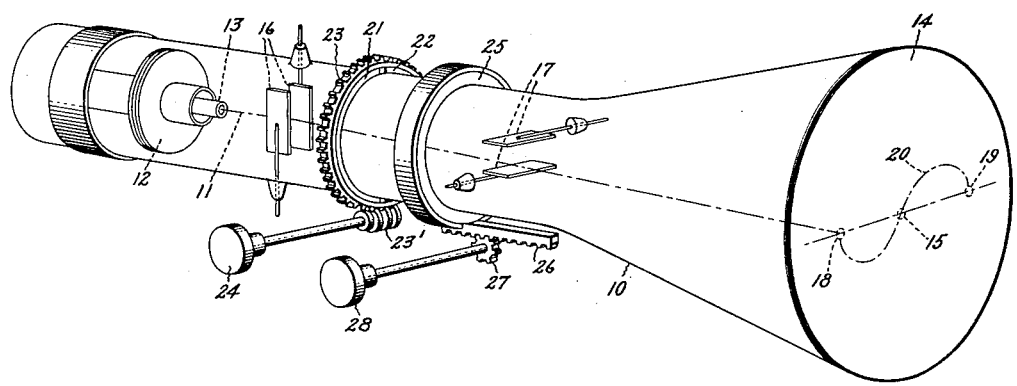
Figure 2:
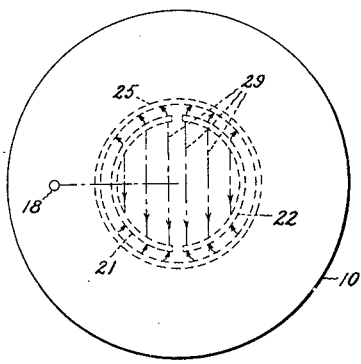

Referring now to Fig. 1, I have here illustrated a usual form of cathode ray tube without its circuit connections and with the addition of my invention thereto. The tube consists of a sealed glass envelope 10 having in one end a cathode and focusing means for emitting a cathode ray or beam represented at 11. The cathode and focusing means, comonly called cathode ray gun, are not represented in detail but it will be understood that a suitable cathode ray gun is placed at the left central end of the tube and cathode rays are shot toward the tracing surface 14.

The cathode ray beam passes down the length of the tube and is projected upon a tracing surface 14 which is here represented as the end surface of the enlarged portion of the glass tube which surface is provided with a fluorescent screen to make the beam easily visible thereon. Ordinarily, the beam will strike the surface at its center 15. The tube shown is provided with a pair of deflecting plates 16 for deflecting the ray along a horizontal axis and a pair of deflecting plates 17 for deflecting the ray along a vertical axis. These plates are on opposite sides of the undeflected path of the ray on axes which are at right angles to each other, and voltages responsive to the phenomenon to be investigated may be impressed upon these plates, causing the ray to be deflected in a direction and by an amount which is proportional to the direction and magnitude of the applied voltages in the two axes. Ordinarily, the plates 16 are employed to sweep the ray across the horizontal axis at a uniform rate while it is deflected in the vertical axis by some voltage under investigation applied to plates 17.

In order to utilize the tracing surface to the best advantage, it may be desirable to start the tracing operation at point 18 instead of at point 15. In this way, we may then apply a sweep voltage that would, acting alone, sweep the ray across the horizontal or time axis from 18 to point 19 while, at the same time, the ray may be deflected along a vertical axis by applying alternating voltage across plates 17, producing a resultant record such as is represented at 20 in Fig. 1 without running off the tracing surface or unduly crowding the complete record on half of the available tracing surface.

In the example given, it is, therefore, desirable to shift the zero position of the cathode ray from point 15 to point 18 before starting the tracing operation and this is accomplished by means of the present invention.

Substantially surrounding the tube 10 at a point between the two sets of deflecting plates 16 and 17, I have provided a pair of C-shaped permanent magnets 21 and 22. These permanent magnets may be made from thin strips of cobalt steel bent into the shapes desired, having an inside curvature corresponding substantially to the curvature of the outer circular wall of the tube 10 at this point. They are positioned about the cylindrical portion of the tube as segments of a band.

The two magnets have like poles facing each other at their ends which are equally separated by a relatively small gap, such as is represented, and these magnets are supported in this relation by a ring 23 made of non-magnetic material, such as brass, and provided with worm-gear teeth in its outer surface. This worm gear meshes with a worm 23' which may be rotated by the thumb piece 24. The ring 23 and the two magnets 21 and 22 may thus be rotated as a unit about tube 10 as an axis. Since the permanent magnets have like poles facing each other, they will produce a flux through the tube of the character represented by the arrows 29 in Fig. 2, where the magnets are represented in outline by dotted lines. The relative disposition of the two magnets is such as to cause the magnetic field crossing the tube to be of substantially uniform density, as represented by the arrows 29.

Now, as is known, a magnetic field will produce a deflection of a cathode ray, the direction of deflection being dependent upon the direction of the field and the extent of the deflection being proportional to the strength of such field. Thus, in Fig. 2, the ray is deflected to the left from the center of the tracing screen to the point 18 and Fig. 2 may be considered as the resulting action of the field upon the ray when looking at the large or viewing end of the tube and considering that the ray is bent when it passes through the magnetic field opposite magnets 21 and 22 and diverges at an angle from the central axis of the tube at this point to strike the tracing surface at point 18. The direction of the field and the resulting direction of bending of the cathode ray are adjusted as desired by rotating the axis of this field by turning the thumb nut 24.

In Fig. 3, the magnets have been rotated through an angle of about forty-five degrees in a counter-clockwise direction as viewed from the large end of the tube and the ray is bent downward by a corresponding angle and strikes the tracing surface at point 30.

In Fig. 4, the field has been rotated by one hundred and eighty degrees from that represented in Fig. 2 and its direction reversed so as to deflect the ray to the right to strike the tracing screen at point 31.

The amount of bending of the ray and the distance of the points 18, 30, and 31 from the center of the tracing surface are dependent upon the strength of the magnetic field through the tube and, to adjust this strength, I prefer to shunt more or less of the flux from the permanent magnets by means of a soft iron shunting ring represented at 25, also surrounding the tube 10, and adjustable lengthwise of the tube toward and away from the permanent magnet field assembly and in a plane parallel thereto by a rack 26 secured to the shunt and a pinion 27 that may be rotated by the thumb piece 28. When the shunt ring 25 is moved closely adjacent the field-producing means, it shunts substantially all of the flux thereof and, when moved away from the field-producing means, less and less of the field is shunted and the field strength through the tube increases. This shunting action is also represented in Figs. 2, 3, and 4 by the arrows between the shunt ring 25 and the permanent magnets 21 and 22.

The shunt being symmetrical to the axis of the tube and also to the axis of the field-producing means, it practically does not disturb the uniformity of the field through the tube for any given adjustment and, thus, I can produce a uniform field through the tube of any desirable strength and of any desirable direction, and can, thus, place the zero position of the ray at any desired point on the tracing surface.

Fig. 3 represents an adjustment suitable for taking an oscillograph record or observation where it is expected that the record will be produced mostly or entirely above the horizontal or zero-measurement axis. Here the ray is initially shifted to point 30. A suitable sweep voltage applied to plates 16 will sweep the ray to the right so that the line 30—32 represents the horizontal time axis and zero voltage across deflection plates 17, and the curve 33 represents a record that may now be taken by applying a voltage of the character represented by this curve across plates 17. If an attempt is made to take such a record with the apparatus adjusted for the same sensitivity but without initially shifting the cathode ray from the center of the tracing screen, the upper and usually the most important portion of the record would be lost. This illustrates another example of the utility of the invention where the zero-measurement axis is adjusted parallel to itself to a lower position and the measurement axis is shifted to the left to bring the record into a satisfactory position on the tracing surface.

In accordance with the provisions of the patent statutes I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A cathode ray tube, a tracing surface therefor, means for projecting a cathode ray through said tube onto said surface, two sets of deflecting means at different axial positions in said tube, one set for deflecting the ray along one axis, and the other set for deflecting the ray along a different axis, and means located external to the tube for producing an adjustable but substantially uniform magnetic field through said tube in any desired direction in a plane at right angles to the normal direction of the ray between said two sets of deflecting means.

2. A cathode ray tube having a cylindrical portion, a tracing surface, means for projecting a cathode ray through the cylindrical portion of said tube onto said surface, a pair of C-shaped permanent magnets positioned as segments of a circular band closely surrounding the cylindrical portion of said tube with their like poles facing each other but spaced apart so as to produce a substantially uniform unidirectional field through said tube in a plane at right angles to its axis, and means for supporting said magnets in said relationship and rotating the same about the tube in said plane.

3. A cathode ray tube having a cylindrical portion, a tracing surface for said tube, means for projecting a cathode ray through the cylindrical portion onto said surface, a pair of C-shaped permanent magnets supported closely about the cylindrical portion of the tube as segments of a band with their like poles facing each other but equally spaced apart at opposite ends to produce a substantially uniform magnetic field through the tube in a plane at right angles to its axis, and a ring of magnetic material surrounding said tube adjacent and parallel to the permanent magnet assembly and adjustable towards and away therefrom to shunt a portion of the flux of said permanent magnets to vary the field through the tube.

HANS P. KUEHNI.